(12) United States Patent
Deivasigamani et al.

(10) Patent No.: US 10,064,112 B2
(45) Date of Patent: Aug. 28, 2018

(54) APPARATUS, SYSTEMS AND METHODS FOR SWITCHING BETWEEN RADIO ACCESS TECHNOLOGIES

(71) Applicant: APPLE INC., Cupertino, CA (US)

(72) Inventors: Giri Prassad Deivasigamani, San Jose, CA (US); Gencer Cili, Oakville (CA); Muhammad A. Alam, San Jose, CA (US); Guarav Nukala, Milpitas, CA (US); Luciano M. Verger, San Jose, CA (US); Yogesh D. Karandikar, San Jose, CA (US); Srinivasan Vasudeven, Santa Clara, CA (US); Deepak Chitlur Lakshman, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 174 days.

(21) Appl. No.: 14/727,550

(22) Filed: Jun. 1, 2015

(65) Prior Publication Data

US 2016/0353344 A1 Dec. 1, 2016

Related U.S. Application Data

(60) Provisional application No. 62/168,542, filed on May 29, 2015.

(51) Int. Cl.
*H04W 4/00* (2018.01)
*H04W 36/14* (2009.01)
(Continued)

(52) U.S. Cl.
CPC ............ *H04W 36/14* (2013.01); *H04M 15/57* (2013.01); *H04W 24/10* (2013.01); *H04W 36/0022* (2013.01); *H04W 36/30* (2013.01); *H04W 48/18* (2013.01); *H04W 76/18* (2018.02); *H04W 76/19* (2018.02); *H04W 88/06* (2013.01)

(58) Field of Classification Search
CPC .......... H04W 76/027–76/028; H04W 36/0022
See application file for complete search history.

(56) References Cited

U.S. PATENT DOCUMENTS

| 2005/0078616 A1* | 4/2005 | Nevo ..................... H04L 12/66 370/278 |
| 2006/0268836 A1* | 11/2006 | Prentice .............. H04M 1/2473 370/352 |

(Continued)

*Primary Examiner* — Chi H Pham
*Assistant Examiner* — Fahmida Chowdhury
(74) *Attorney, Agent, or Firm* — Fay Kaplun & Marcin, LLP (57) ABSTRACT

A user equipment ("UE") connected to a first network that performs methods including receiving a page from the first network indicating an incoming voice call, when it is determined the voice call was not successfully connected, incrementing a value of a counter and when the value satisfies the threshold, switching from the first network to a second network. Another method includes originating a voice call via the first network, when it is determined the voice call was not successfully connected, opening a socket connection with the first network and attempting to re-originate the voice call via the first network. Another method includes determining whether the UE has switched a connection from a first network to a second network and when it is determined that the UE has switched the connection to the second network, initiating an action by the UE.

16 Claims, 7 Drawing Sheets

(51) Int. Cl.
*H04W 24/10* (2009.01)
*H04M 15/00* (2006.01)
*H04W 48/18* (2009.01)
*H04W 36/30* (2009.01)
*H04W 36/00* (2009.01)
*H04W 76/18* (2018.01)
*H04W 88/06* (2009.01)
*H04W 76/19* (2018.01)

(56) References Cited

U.S. PATENT DOCUMENTS

| | | | | |
|---|---|---|---|---|
| 2011/0231562 | A1* | 9/2011 | Karlsen | H04L 65/1016 709/228 |
| 2012/0039167 | A1* | 2/2012 | Swaminathan | H04W 76/026 370/225 |
| 2013/0185428 | A1* | 7/2013 | Houghton | H04L 69/40 709/225 |
| 2013/0258883 | A1* | 10/2013 | Vargas Bautista | H04W 36/0094 370/252 |
| 2013/0298170 | A1* | 11/2013 | ElArabawy | H04W 28/0231 725/62 |
| 2014/0079023 | A1* | 3/2014 | Lindsay | H04W 36/0022 370/331 |
| 2014/0370842 | A1* | 12/2014 | Abtin | H04L 65/1069 455/404.2 |
| 2015/0124588 | A1* | 5/2015 | Hallenstal | H04L 65/1016 370/221 |
| 2015/0201454 | A1* | 7/2015 | Shukair | H04W 76/045 370/329 |
| 2015/0350983 | A1* | 12/2015 | Kwok | H04L 65/1069 370/331 |
| 2016/0029228 | A1* | 1/2016 | Mufti | H04W 24/04 370/225 |
| 2016/0094397 | A1* | 3/2016 | Barth | H04L 65/1016 709/203 |
| 2016/0119822 | A1* | 4/2016 | Chimmapudi | H04W 24/04 370/217 |
| 2016/0262087 | A1* | 9/2016 | Thondapu | H04W 48/06 |
| 2016/0330748 | A1* | 11/2016 | Bindrim | H04L 65/1013 |
| 2017/0005705 | A1* | 1/2017 | Casselman | H04B 7/024 |

* cited by examiner

APPARATUS, SYSTEMS AND METHODS FOR SWITCHING BETWEEN RADIO ACCESS TECHNOLOGIES

PRIORITY CLAIM/INCORPORATION BY REFERENCE

This application claims priority to U.S. Provisional Application 62/168,542 entitled "Apparatus, Systems and Methods for Switching Between Radio Access Technologies," filed on May 29, 2015, the entirety of which is incorporated herein by reference.

BACKGROUND

Long-Term Evolution ("LTE") is a standard for wireless communication of high-speed data for mobile phones and data terminals. The LTE standard has been developed by the 3rd Generation Partnership Project ("3GPP") and is described as a natural upgrade path for carriers using prior generation networks or "legacy" protocols, such as Global System for Mobile Communications/Universal Mobile Telecommunications System ("GSM/UMTS") protocols and Code Division Multiple Access ("CDMA") 2000 1× (e.g., 1×RTT or simply "1×") wireless communication protocols. Each of these different types of networks and protocols may be termed radio access technologies ("RATs").

Through the usage of an all-Internet Protocol ("IP") network, the LTE standard supports only packet switching ("PS") data transmissions. Similar to many other protocols, an IP network breaks data into blocks and wraps the blocks into structures called packets. Each packet contains, along with the data load, information about the IP address of the source and the destination nodes, sequence numbers, control information, etc. In a circuit switched ("CS") network, the communication channel remains open and in use throughout the duration of the call and the call data is transmitted all at once without being broken into blocks.

Since voice calls in GSM, UMTS and CDMA2000 utilize circuit switched data transmissions, carriers adopting the LTE standard need to re-engineer their voice call network. Various approaches include Voice over LTE ("VoLTE"), circuit-switched fallback ("CSFB"), and simultaneous voice and LTE ("SVLTE"). For instance, the VoLTE approach uses an IP multimedia subsystem ("IMS") network having specific profiles for control and media planes of voice service on LTE. Accordingly, VoLTE communications result in the voice service being delivered as data flows within the LTE data bearer. Thus, there is no requirement for the legacy circuit-switched voice network to be maintained. Furthermore, VoLTE communications has up to three times more voice and data capacity than UMTS networks and up to six times more than GSM networks. Using the CSFB approach, LTE provides data services while a received or initiated voice call falls back to the circuit-switched network. Under the SVLTE approach, the user equipment ("UE") works simultaneously in both the LTE and circuit switched modes, wherein the LTE mode provides data services and the circuit switched mode provides the voice service.

SUMMARY

A method performed by a user equipment ("UE") connected to a first network. The method including receiving a page from the first network indicating an incoming voice call, determining whether the voice call was successfully connected, when it is determined the voice call was not successfully connected, incrementing a value of a counter, determining whether the value of the counter satisfies a threshold and when the value satisfies the threshold, switching from the first network to a second network.

A method performed by a user equipment ("UE") connected to a first network. The method including originating a voice call via the first network, determining whether the voice call was successfully connected, when it is determined the voice call was not successfully connected, opening a socket connection with the first network and attempting to re-originate the voice call via the first network.

A method performed by a user equipment ("UE") connected to a first network. The method including determining whether the UE has switched a connection from a first network to a second network and when it is determined that the UE has switched the connection to the second network, initiating an action by the UE. The action includes one of re-initiating a TCP connection with a Proxy-Call Session Control Function (P-CSCF) of an IP Multimedia Subsystem (IMS) of the second network, resetting a registration timer of the UE, wherein the registration timer is based on a connection with the IMS of the second network and wherein when the registration timer expires, the UE reinitiates a TCP connection with the P-CSCF of the IMS of the second network, or sending feedback from a lower layer of a network stack of the UE to a higher layer of the network stack of the UE, wherein the feedback is based on a connection with the IMS of the second network.

DETAILED DESCRIPTION

The exemplary embodiments may be further understood with reference to the following description and the appended drawings, wherein like elements are referred to with the same reference numerals. The exemplary embodiments describe apparatuses, systems and methods for switching between different radio access technologies ("RATs"). The exemplary embodiments provide manners of determining whether a RAT switch should occur, determining when a RAT switch should occur and diagnosing issues with connections when RAT switches do occur.

Figure 1:
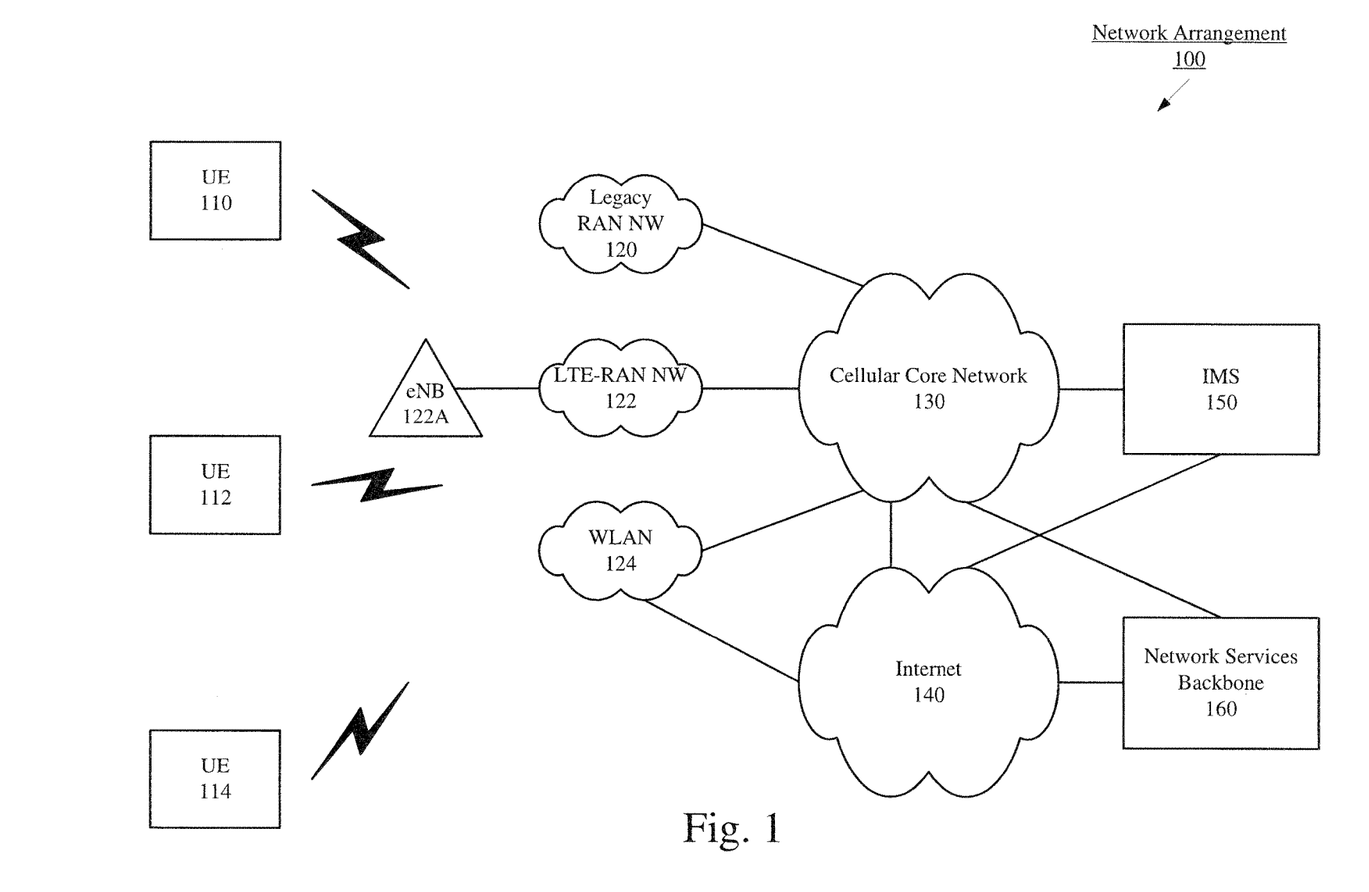
FIG. 1 shows an exemplary network arrangement, according to various embodiments described herein.

FIG. 1 shows an exemplary network arrangement 100 according to various embodiments described herein. The exemplary network arrangement 100 includes UEs 110-114. Those skilled in the art will understand that the UEs 110-114 may be any type of electronic component that is configured to communicate via a network, e.g., mobile phones, tablet computers, desktop computers, smartphones, phablets, embedded devices, wearables, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may communicate are a legacy radio access network (RAN) 120, a LTE RAN (LTE-RAN) 122, and a wireless local area network (WLAN) 124. More specifically, the legacy RAN 120 may be a circuit switched network, e.g., GSM, UMTS, CDMA, 1×RTT, 1×, etc. In this example, each of the networks 120-124 is a wireless network with which the UEs 110-114 may communicate wirelessly. However, it should be understood that the UEs 110-114 may also communicate with other types of networks and may also communicate using a wired connection. With regards to the exemplary embodiments, the UEs 110-114 may establish a connection with the LTE-RAN 122 to, among other functionalities, perform data transfers, voice calls and exchange Short Messaging Service ("SMS") messages with the LTE network. In another example, the UEs 110-114 may communicate with the legacy RAN 120 to perform some or all of the same functionalities, depending, for example, on the availability of a connection between the UEs 110-114 and the LTE-RAN 122. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from UEs that are equipped with the appropriate cellular chip set. Examples of the legacy RAN 120 may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the client stations 110-114 to communicate with the WLAN 124.

In addition to the networks 120-124, the network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the UEs 110-114 using the IP protocol. In the context of the LTE-RAN 222, the IMS 150 may provide the UEs 110-114 with voice capabilities (e.g., VoLTE) and Short Messaging Services (SMS). In the context of the legacy RAN 220, the IMS 150 may provide the UEs 110-114 with SMS services. The UEs 110-114, in order to use the services provided by the IMS 150, need to register with the IMS 150. The IMS 150 may include a variety of components to accomplish these tasks. For example, a typical IMS 150 includes a Home Subscriber Server (HSS) that stores subscription information for a user of the UEs 110-114. This subscription information is used to provide the correct multimedia services to the user. The IMS 150 may communicate with the cellular core network 130 and the Internet 140 to provide the multimedia services to the UEs 110-114. The IMS 150 is shown in close proximity to the cellular core network 130 because the cellular provider typically implements the functionality of the IMS 150. However, it is not necessary for this to be the case such as when the IMS 150 is provided by another party. Thus, the network arrangement 100 allows the UEs 110-114 to perform functionalities generally associated with computers and cellular networks.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The network services backbone 160 may be provided by any entity or a set of entities. In one example, the network services backbone 160 is provided by the supplier of one or more of the UEs 110-114. In another example, the network services backbone 160 is provided by the cellular network provider. In still a further example, the network services backbone 160 is provided by a third party unrelated to the cellular network provider or the supplier of the UEs 110-114.

The exemplary embodiments relate to the UEs 110-114 connecting to the legacy RAN 120 and the LTE-RAN 122, the connection to the LTE-RAN 122 being via an eNB 122A. Initially, the UEs 110-114 may establish a connection to the LTE-RAN 122. Those skilled in the art will understand that any association procedure may be performed for the UEs 110-114 to connect to the LTE-RAN 122. For example, as discussed above, the LTE-RAN 122 may be associated with a particular cellular provider where the UE 110-114 and/or the user thereof has a contract and credential information (e.g., stored on a SIM card). Upon detecting the presence of the LTE-RAN 122, the UEs 110-114 may transmit the corresponding credential information to associate with the LTE-RAN 122. More specifically, the UEs 110-114 may associate with a specific access point (e.g., the eNB 122A of the LTE-RAN 122). In the remainder of the description, the UE 110 will be described as the UE performing various functionalities. However, it may be considered that the UEs 112-114 may also perform the same functionalities.

As described above, when the UE 110 is associated with the LTE-RAN 122, the UE 110 may register with the IMS 150 to receive certain services such as VoLTE and SMS services. As part of registering with the IMS 150, the UE 110 will configure its internal stack to an LTE protocol stack. In addition, since the services will be provided using the IP based network, the UE 110 may also receive an IP address. During operation, there may be instances when the UE 110 attempts to attach to the legacy RAN 120 rather than the LTE-RAN 122. For example, the connection between the UE 110 and the LTE-RAN 122 becomes unacceptable, e.g., the UE 110 moves out of range of the eNBs of the LTE-RAN 122, there is signal interference between UE 110 and the eNBs of the LTE-RAN 122, etc. Those skilled in the art will understand that there may be many reasons for the connection becoming unacceptable. When this occurs, the UE 110 may attach to the legacy RAN 122 and re-register with the IMS 150 to, for example, receive SMS services via the legacy RAN 120. The UE 110, as part of attaching to the legacy RAN 120, may have to switch the internal stack from the LTE stack to a legacy stack. In addition, because the UE is re-registering with the IMS 150, the UE 110 may receive a new IP address. Subsequently, when the LTE-RAN 122 becomes available again to the UE 110, the UE 110 may then switch back and attach to the LTE-RAN 122.

As will be described in greater detail below, this switching between different radio access technologies ("RATs") (e.g., LTE-RAN 122 and legacy RAN 120) may lead to various degradations in performance for both the UEs and the network. In addition, deciding when to switch between RATS may also become an issue. The exemplary embodiments will describe several exemplary techniques for controlling the switching between RATs by the UEs to allow for better performance of the UEs and the networks.

In one exemplary scenario, the network arrangement 100 may implement a circuit switched fallback ("CSFB") functionality. The CSFB functionality provides that the UE 110 will switch from VoLTE to a circuit switched call when a VoLTE call cannot be completed, whether initially or after the VoLTE call is connected. As described above, a VoLTE call is serviced via the LTE-RAN 122, while the circuit switched call is serviced via the legacy RAN 120. Typically, the UE 110 will need to detach from the LTE-RAN 122 and attach to the legacy RAN 120 to receive or originate a circuit switched call. However, as described above, the preference of the UE 110 and the network 100 is for the UE 110 to not switch between RATS unless it is necessary.

To provide an exemplary scenario using the network arrangement 100, it may be considered that UE 110 and UE 112 are connected to the LTE-RAN 122 and the UE 112 is attempting to make a voice call (e.g., VoLTE call) to the UE 110. In such a scenario, the UE 112 originating the call may be termed the mobile originating ("MO") device and the UE 110 that is to receive the call may be termed the mobile terminating ("MT") device. The complete method for connecting a VoLTE call is well known to those skilled in the art and will not be described in detail. The following provides a short summary of the connection process and is not intended to describe the entire process in detail. The MO device (UE 112) sends a Session Initiation Protocol ("SIP") invite addressed to the MT device (UE 110). The network (LTE-RAN 122) pages the MT device (UE 110) including the SIP invite. The MT device (UE 110) responds to the page by sending a SIP Response addressed to the MO device (UE 112). Further signals are exchanged between the devices and the voice call is connected.

However, if the MT device (UE 110) does not respond to the page, the call will not be connected. In one example, the MT device (UE 110) may be receiving the pages, but because of uplink (UL) limitations, the LTE-RAN 122 does not receive the SIP Response from the MT device (UE 110) and the call is not completed. If the CSFB functionality is implemented, the MT device (UE 110) will fallback to the legacy RAN 122 to receive the call via the circuit switched network. However, as described above, the switching of RATs may cause certain issues and since, in this example, the MT device (UE 110) is receiving pages from the LTE-RAN 122, it may be better to remain connected to the LTE-RAN 122 instead of switching to the legacy RAN 120.

In the exemplary embodiments, the UE 110 implements a connection counter to determine the number of times it has been unsuccessful in responding to a page to connect a call. The switch to the legacy RAN 120 is controlled based on this counter. If the connection counter reaches a threshold amount, e.g., a number of times the MT device (UE 110) has not successfully responded to the page, the MT device (UE 110) will switch from the LTE-RAN 122 to the legacy RAN 120 to attempt to connect the call via the circuit switched network.

Figure 2:
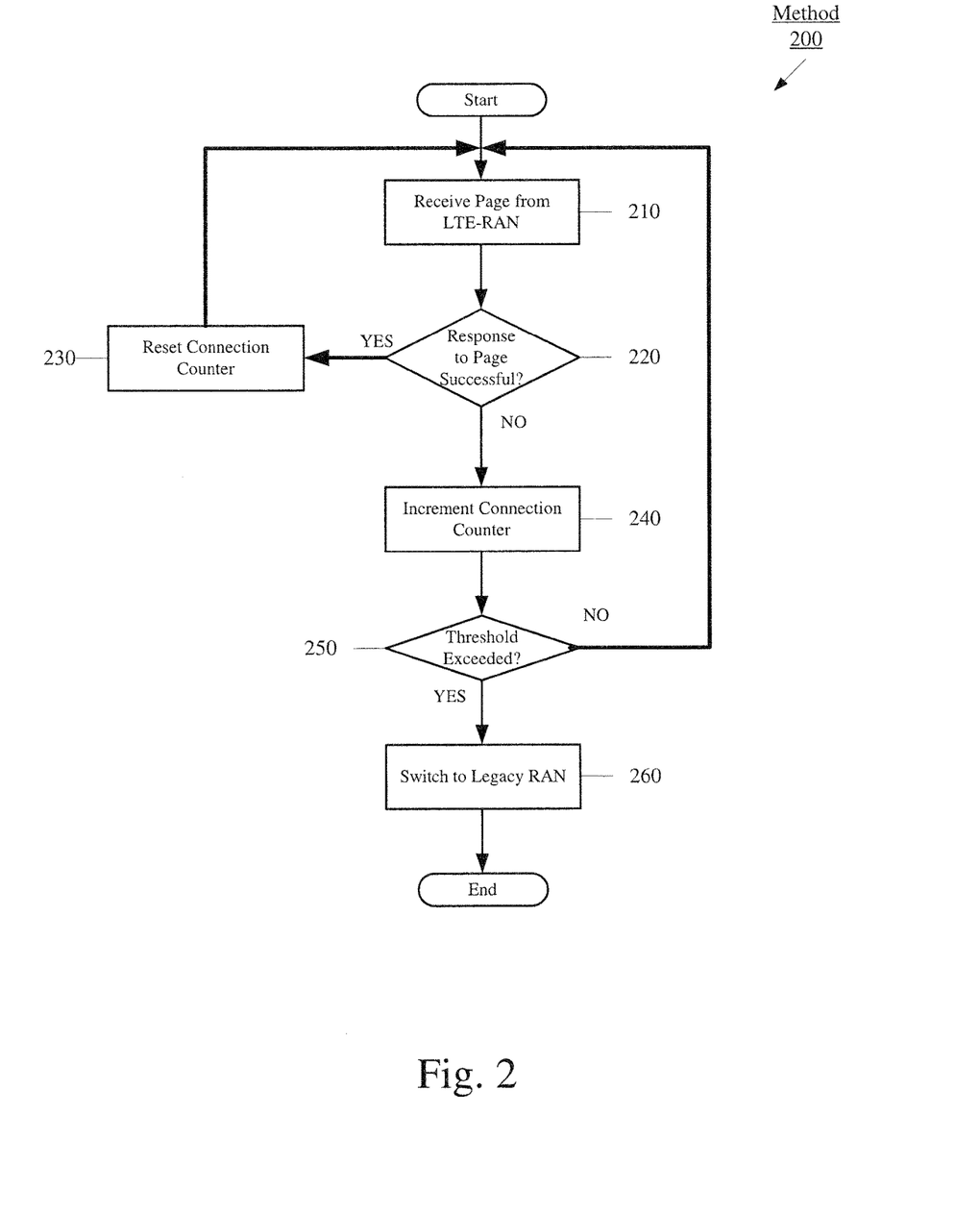
FIG. 2 shows an exemplary method for switching between RATs based on a connection counter implemented by a UE, according to various embodiments described herein.

FIG. 2 shows an exemplary method 200 for switching between RATs based on a connection counter implemented by a UE according to various embodiments described herein. The method 200 will be described with reference to the network arrangement 100 of FIG. 1 and the above described scenario where the UE 112 is attempting a VoLTE call to the UE 110. It may also be considered that the UE 110 implements a connection counter, which may be implemented as a hardware device, a software function or a combination thereof.

In 210, the UE 110 receives the page from the LTE-RAN 122. As described above, in this scenario it may be considered that the downlink (DL) connection is sufficient such that the UE 110 receives the page. In 220, the UE 110 determines if the UE 110 was successful in responding to the page, e.g., the VoLTE call is successfully connected. For example, if the UE 110 is able to close a service request with the LTE-RAN 122 such that dedicated bearers are allocated for the VoLTE call and the UE sends a "200 OK SIP" message to the LTE-RAN 122, it may be considered that the UE 110 was successful in responding to the page.

If the UE 110 is successful in responding to the page, the UE 110 will reset the connection counter in 230 and returns to 210 to wait for the next page from the LTE-RAN 122. In this scenario, the UE 110 was successful in connecting the VoLTE call, so there is no need to switch to the legacy RAN 120. In addition, the connection counter may be reset because the UE 110 may consider that it is more likely that it will successfully respond to the page and therefore the connection counter may be rest so that any previous unsuccessful page responses are cleared from the connection counter.

If the response to the page is unsuccessful in 220, the UE 110 will increment the connection counter in 240 to indicate that the UE 110 was not successful in responding to the current page. In 250, the UE 110 will determine whether the connection counter exceeds a threshold. As will be described in greater detail below, the threshold is the value of the connection counter that will trigger a switch by the UE 110 from the LTE-RAN 122 to the legacy RAN 120. When the UE 110 does not successfully connect to the VoLTE call, a typical user of the UE 112 that is attempting to place the call may continue to attempt to call the UE 110. However, if there has been no change in circumstance of the UE 110, e.g., the UE 110 continues operate in a UL limited fashion because the UE 110 remains in the same physical environment, it continues to be likely that the UE 110 will not successfully respond to the page. The same physical environment may include the same location, the same handgrip, the same occlusions, etc. Any factors that impact the ability of the UE 110 to respond to the page. Thus, the threshold value for the connection counter may be set at a value that allows several attempts to be made to connect the call via the LTE-RAN 122 to avoid an immediate switch to the legacy RAN 120, but not so many that the UE 110 will not switch to the legacy RAN 120 and miss the call from the UE 112. In one example, the threshold may be set to five (5) unsuccessful attempts before switching to the legacy RAN 120. However, this is only an example and the number of unsuccessful attempts may be set higher or lower.

If the threshold is not exceeded in 250, the method returns to 210 to await the next page from the LTE-RAN 122. As described above, the user of the UE 112 will likely make another attempt to call the UE 110, meaning another page should be coming in a short period of time. If the threshold has been exceeded in 250, the UE 110 switches to the legacy RAN 120 to receive the voice call via the circuit switched network. Those skilled in the art will understand that the cellular core network 130, when it understands that the LTE-RAN 122 has not received a response to the page, will attempt to page the UE 110 on the legacy RAN 120. Thus, when the UE 110 does switch to the legacy RAN 120, the UE 110 should receive a page for the voice call. As described above, by implementing the connection counter, the UE 110 balances the desire to remain on the LTE-RAN 122 with the desire to connect to all incoming calls.

In another exemplary embodiment, the UE 110 may measure properties of reference signals received from the LTE-RAN 122. Examples of the properties may include the Received Signal Strength Indicator ("RSSI"), Reference Signal Received Power ("RSRP"), Reference Signal Received Quality ("RSRQ"), etc. As described above, the exemplary scenario may arise when the UE 110 remains in the same physical location, e.g., multiple page attempts from the LTE-RAN 122. Thus, when the measured properties of the reference signals remain substantially similar, the UE 110 may determine that the UE 110 is in the same relative physical location, such that it is likely that the UE 110 will be unsuccessful in responding to the next page attempt. Thus, in this exemplary embodiment, the measured properties may be used in the determination as to whether the UE 110 should switch to the legacy RAN 120.

This exemplary embodiment may be used in conjunction with the method 200 of FIG. 2. For example, the threshold value may be dynamically set based on the measured property. An example may include a first threshold if the measured property remains within a fixed percentage of previous measurements and a second threshold if the measured property varies by more than the fixed percentage from previous measurements. It may be considered that the second threshold may be higher than the first threshold because if the measured property has changed, it is more likely that the circumstances of the UE 110 have changed and therefore, there is a higher likelihood that the UE 110 will successfully respond to a subsequent page.

This exemplary embodiment may also be used independent of the method 200 of FIG. 2. For example, once the UE 110 determines that the measured property is substantially similar to the measured property from a previous unsuccessful page, the UE 110 may immediately switch to the legacy RAN 120 because the UE 110 may be aware that it is unlikely to successfully respond to the page.

In another exemplary scenario, the UE 110 may disconnect from the LTE-RAN 122 and connect to the legacy RAN 120 when attempting to originate a VoLTE call (e.g., the UE 110 is the MO device) because there is no socket open for the VoLTE call. This situation may occur when the Proxy-Call Session Control Function (P-CSCF) prematurely terminated a socket for the UE 110. Those skilled in the art will understand that the P-CSCF is the first contact point for the IMS 150. Thus, it should be understood that when referring to the P-CSCF in this description, this functionality resides on the network side of the network arrangement 100, e.g., in the core of the IMS 150. The P-CSCF is the entry point to the IMS 150 domain and serves as the outbound proxy server for the UE 110. The UE attaches to the P-CSCF prior to performing IMS registrations and initiating SIP sessions. All SIP signaling traffic either from or to the UE 110 goes through the P-CSCF.

A socket may be considered an endpoint instance at the transport layer for facilitating communication between endpoints. There are two general types of sockets, a UDP socket that is connectionless and a TCP/STCP socket that are connection oriented or stream based. A TCP socket may be considered as a combination of an IP address and a port. A TCP connection is defined by two sockets. In the exemplary embodiments, it will be considered that the VoLTE connection is a TCP connection. However, SIP may also use UDP connections for the IMS/VoLTE signaling.

The UE 110 or the P-CSCF may originate the socket, but the P-CSCF terminates the socket. In a typical implementation, there is a 200 second inactivity timer. If this timer times out because of no activity on the TCP connection, the P-CSCF will terminate the socket. In practice, there are several situations that occur that lead to issues with connecting VoLTE calls. In a first situation, the P-CSCF prematurely terminates the socket, e.g., before the expiration of the timer. This is a network side error, but impacts the UE 110 because the UE 110 may not successfully originate a VoLTE call if no socket is open. In another situation, a race condition occurs where the UE 110 attempts to originate a VoLTE call at or near the expiration of the timer, e.g., sends a SIP invite to the P-CSCF, but before receiving any response, the P-CSCF terminates the socket because the timer has timed out. Those skilled in the art will understand that there may be other reasons for a TCP socket being terminated and the exemplary embodiments may be used in any of the situations where the TCP socket is not available for the VoLTE call.

The exemplary embodiments implement a retry mechanism on the UE 110 for VoLTE calls when the reason for the call failure is a TCP socket not being available. Thus, instead of declaring the attempted VoLTE call a failed VoLTE attempt and falling back to the legacy RAN 120, the UE 110 will first attempt a retry of the VoLTE call on the LTE-RAN 122 by reopening a socket.

Figure 3:
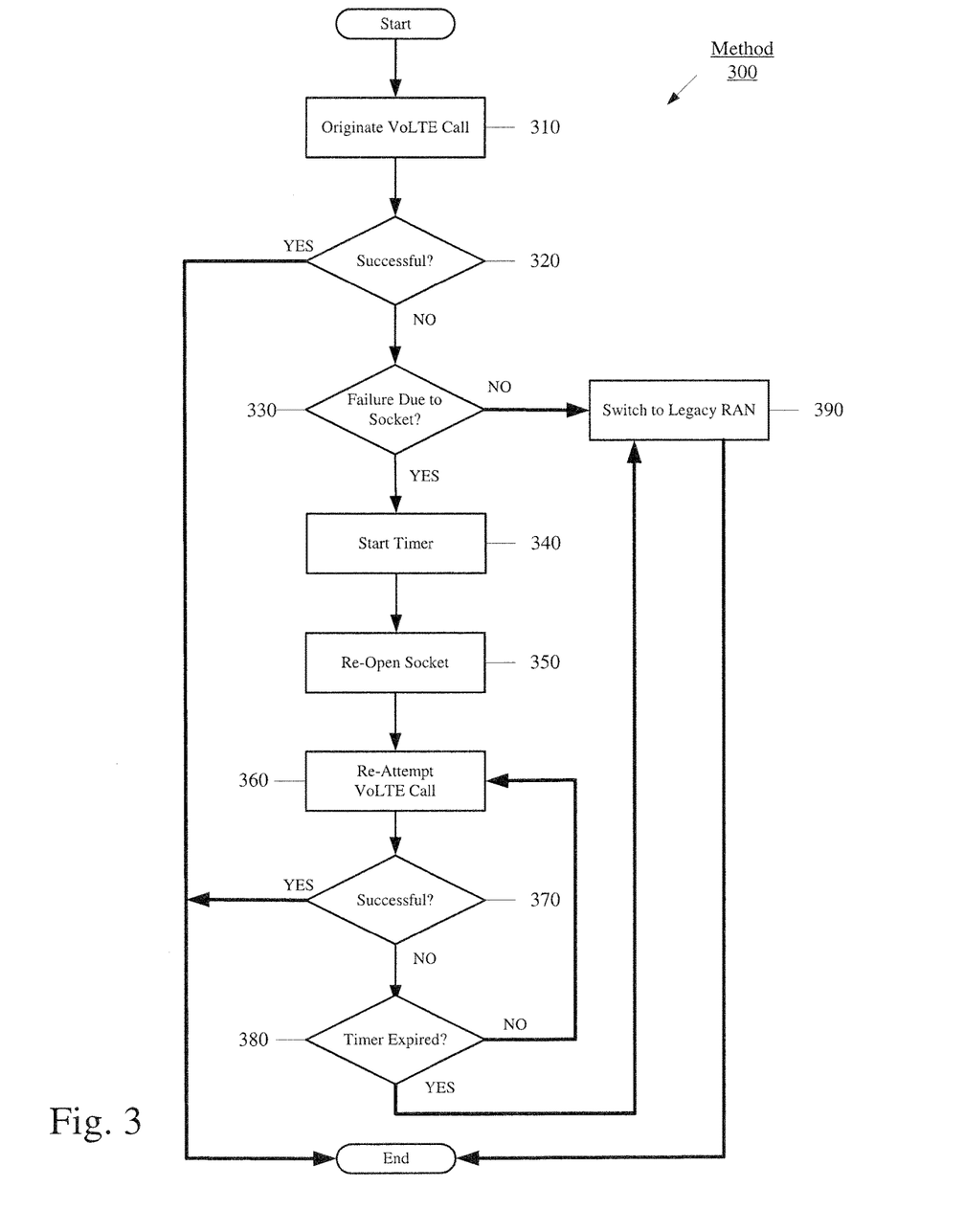
FIG. 3 shows an exemplary method for retrying a VoLTE call origination based on a missing socket connection, according to various embodiments described herein.

FIG. 3 shows an exemplary method 300 for retrying a VoLTE call origination based on a missing socket connection according to various embodiments described herein. The method 300 will be described with reference to the network arrangement 100 of FIG. 1 and the above described scenario where the UE 110 is attempting to originate a VoLTE call, e.g., the UE 110 is the MO device.

In 310, the UE 110 attempts to originate a VoLTE call using the legacy RAN 122. As described above, the method for connecting a VoLTE call is well known to those skilled in the art and is therefore not described in detail. In 320, the UE 110 determines whether the VoLTE call was successfully connected. If the VoLTE call is successfully connected, the method 300 is complete and no further actions are taken.

If the VoLTE call is not successfully connected, the UE 110 determines whether the failure is the result of a lack of a TCP connection, e.g., a TCP socket is not available, in 330. If the failed VoLTE call is the result of some other issue, the UE 110 will fallback to the legacy RAN 120 and re-attempt the voice call as a circuit switched call in 390. If the failed VoLTE call is the result of a TCP socket not being available, the UE 110 will start a timer in 340. In one exemplary embodiment, the timer may be set to 10 seconds. However, this time is only exemplary and other durations may be selected.

As will be described in greater detail below, the timer allows the UE 110 time to reopen a socket and re-attempt the VoLTE call before falling back to the legacy RAN 120. The timer duration balances the desire to remain on the LTE-RAN 122 with the desire to complete the voice call. In the above examples of the P-CSCF prematurely closing the socket and the race situation causing the socket to close, neither of these situations would indicate to the UE 110 that there is a connection problem between the UE 110 and the LTE-RAN 122. Rather, the socket was closed for reasons that are unrelated to the connection. Since it would appear the quality of the connection between the LTE-RAN 122 and the UE 110 is satisfactory, it is likely that the VoLTE call would connect if a socket could be established. This leverages the fact that the UE 110 has an active IMS 150 registration in the LTE-RAN 122 domain. The UE 110 does not need to re-register with the IMS 150 to initiate a VoLTE call.

Thus, in 350 the UE 110 may attempt to reopen a TCP socket. As described above, the UE 110 or the P-CSCF may open a TCP socket. After the socket is open, the UE 110 may re-attempt to connect the VoLTE call in 360. In 370, the UE 110 again determines if the VoLTE call was successful using the newly opened socket. If the VoLTE call is successful, the method 300 is complete and no further actions are taken.

If the VoLTE call failed, the UE 110 determines whether the timer has timed out in 380. If the timer has not timed out, the UE 110 may again attempt to connect the VoLTE call by returning to 360. However, if the VoLTE call has failed with the newly opened socket and the timer has timed out, the UE 110, in 390, will fallback to the legacy RAN 120 and attempt the voice call as a circuit switched call.

In another exemplary scenario, the UE 110 may initially connect to the LTE-RAN 122 and may register for voice and SMS services using the IMS 150. However, if the UE 110 experiences poor radio conditions with the LTE-RAN 122, the UE 110 may be redirected to the legacy RAN 120. As part of the registration process with the legacy RAN 120, the UE 110 may re-register with the IMS 150 to receive SMS services. Those skilled in the art will understand that the legacy RAN 120 provides voice services via a circuit switched network and therefore the UE 110 does not need to register with the IMS 150 for voice services. If the registration is not successful (e.g., the UE 110 does not receive a response to the registration request), the UE 110 may then re-select the LTE-RAN 122. However, the UE 110 may attempt to re-register with the IMS 150 in the LTE-RAN 122 context before the previous registration has timed out. In practice, it has been seen that this scenario results in the CSFB voice calls that were originated when the UE 110 was connected to the legacy RAN 120, are being rejected when the UE reconnects to the LTE-RAN 122 leading to poor user experiences.

Figure 5:
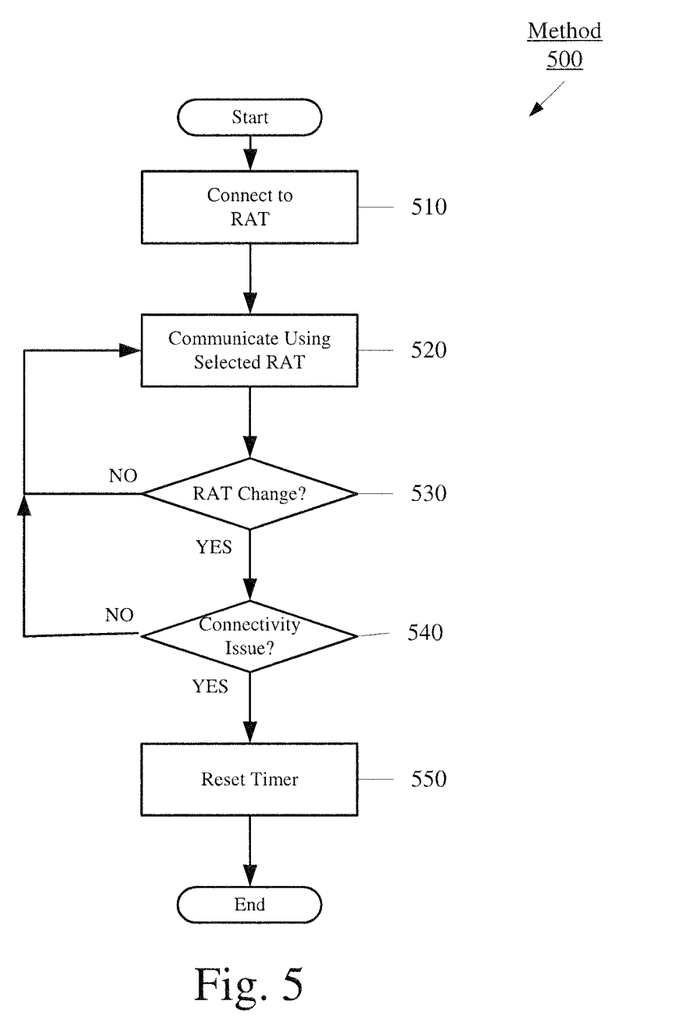
FIG. 5 shows a second exemplary method for switching between RATs, according to various embodiments described herein.
Figure 6:
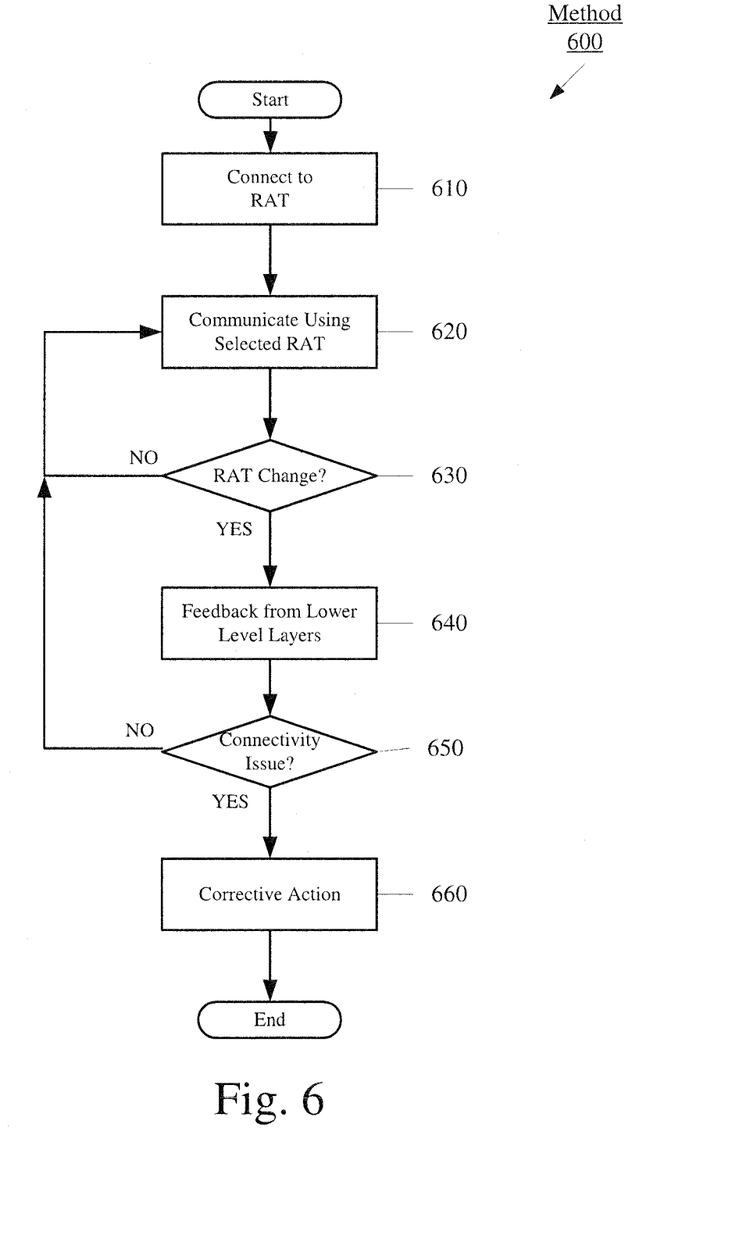
FIG. 6 shows a third exemplary method for switching between RATs, according to various embodiments described herein.

This scenario may be generalized as a connectivity issue between the UE 110 and the IMS 150. This connectivity issue may be between the UE 110 and the IMS 150 directly or the UE 110 and the P-CSCF. This connectivity issue may arise upon reconnection (or even original connection) between the UE 110 and the LTE-RAN 122 or the legacy RAN 120. The following methods described with reference to FIGS. 4-6 provide exemplary manners of detecting and correcting the connectivity issues.

The exemplary embodiments provide methods implemented by the UE 110 to improve this user experience by increasing the likelihood that there are satisfactory connections when there is a change in the RAT. In a first exemplary embodiment, the UE 110 will re-initiate with the P-CSCF upon RAT change to guarantee end-to-end connectivity with the P-CSCF. In a second exemplary embodiment, the UE 110 resets the connection timer based on a RAT change. In a third exemplary embodiment, the upper layers of the UE stack will receive feedback from the lower layers. This feedback may be used to detect connectivity issues.

As described above, when the UE 110 is connected to the LTE-RAN 122 or the legacy RAN 120, the UE 110 will implement a network stack. Those skilled in the art will understand that the currently implemented network stack may depend on the type of RAT to which the UE 110 is connected, e.g., when the UE 110 is connected to the LTE-RAN 122, the UE 110 may implement a first LTE stack, and when the UE 110 is connected to the legacy RAN 120 such as a CDMA network, the UE may implement a second CDMA stack. Upon connection to the IMS 150, at least a portion of the network stack will have IMS related functionalities, e.g., the TCP layer may have a connection to the P-CSCF. In this description, it will be described that the lower layers of the stack implemented by the UE 110 will provide feedback to the higher layers. The layers generally refer to the Open System Interconnected (OSI) model, but may also refer to other types of models such as the related TCP/IP model, the LTE model, etc. Those skilled in the art will understand the network stack layers that are below the transport layer (in the OSI model and the TCP/IP model) or Packet Data Convergence Protocol (PDCP) layer (in the LTE model) are generally referred to as lower layers and the transport layer/PDCP and above are generally referred to as higher layers. However, those skilled in the art will also understand that network stacks may be implemented in various manners and it may be possible to conceptually combine some functionality of the lower layers into the higher layers and vice versa. In this description, the lower layers will be generally referred to as those layers below the transport/PDCP layer.

Figure 4:
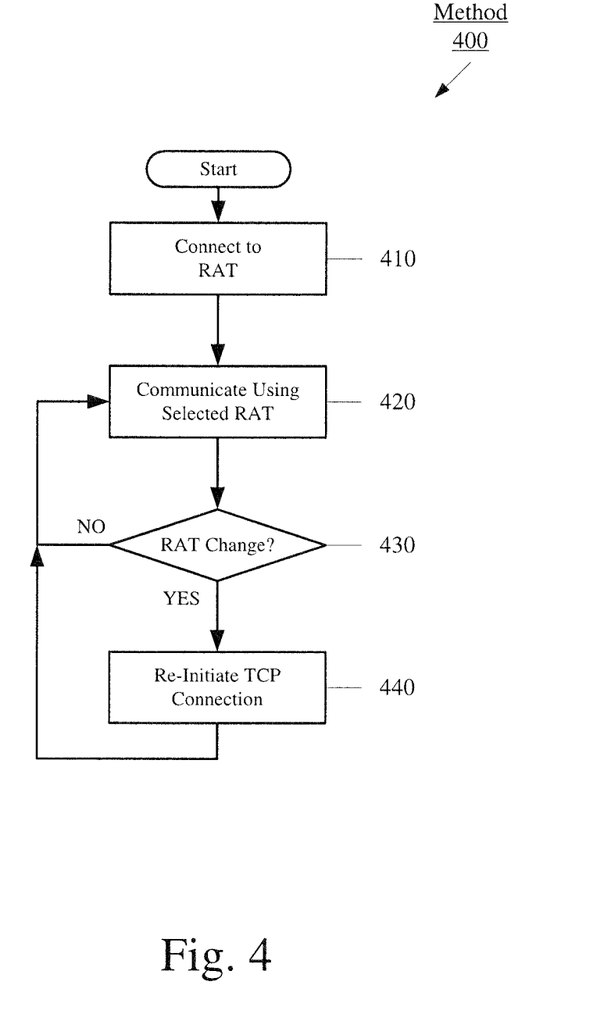
FIG. 4 shows an exemplary method for switching between RATs, according to various embodiments described herein.

FIG. 4 shows an exemplary method 400 for switching between RATs according to various embodiments described herein. The method 400 will be described with reference to the network arrangement 100 of FIG. 1. In the example, it may be considered to address the above-described scenario where the UE 110 is switching between the LTE-RAN 122 and the legacy RAN 120. However, it should be understood that the exemplary method may be applied to any switching between different RATs.

In 410, the UE 110 may connect to a RAT, e.g., the LTE-RAN 122, the legacy RAN 120, etc. Any standard method of connecting to a RAT may be used. As part of this connection to the RAT, the UE 110 may register with the IMS 150, including setting up a TCP connection via the P-CSCF. In 420, the UE 110 may communicate via the connected RAT. For example, the UE 110 may exchange voice traffic, data traffic, etc. using the selected RAT.

At some later point, the UE 110 may switch RATs. Multiple reasons for switching RATs have been described above and any of these reasons or other reasons may cause the UE to switch RATs. If a RAT change is detected in 430, the UE 110 will automatically re-initiate a connection (e.g., a TCP connection) with the P-CSCF in 440. As described above, by automatically re-initiating the TCP connection when a RAT change is detected, the UE 110 will have a connection to the IMS 150. This TCP connection allows the stack of the UE 110 to see the traffic between the RAT and the UE 110. If a connectivity issue arises, e.g., the CSFB call issue described above, the stack of the UE 110 can see the traffic that is being exchanged at the TCP layer. This may allow the UE 110 to determine the issue and resolve the connectivity issue.

For example, if the UE 110 is experiencing trouble handling calls, the UE 110 will understand that it re-initiated the TCP connection with the P-CSCF. The call handling issue may arise from a connectivity issue between the UE 110 and the IMS 150. By monitoring the network traffic being exchanged at the TCP layer, the UE 110 may understand if the connection between the UE 110 and the IMS 150 is satisfactory. If unsatisfactory, the UE 110 may initiate corrective actions. If satisfactory, the UE 110 will understand that the call handling issue may be unrelated to the connectivity between the UE 110 and the IMS 150.

In addition, as described above, when connecting to the IMS 150, the UE 110 receives an IP address. The various changes in RAT may result in a change of the IP address. This change in IP addresses may result in dropped traffic because of misaddressed data packets. The re-initiated TCP connection also allows the stack of the UE 110 to better manage for the IP address changes.

FIG. 5 shows a second exemplary method 500 for switching between RATs according to various embodiments described herein. The method 500 will be described with reference to the network arrangement 100 of FIG. 1. In the example, it may be considered to address the above-described scenario where the UE 110 is switching between the LTE-RAN 122 and the legacy RAN 120. However, it should be understood that the exemplary method may be applied to any switching between different RATs.

In 510, the UE 110 may connect to a RAT and in 520, the UE 110 may communicate via the connected RAT. These actions are the same as described above for 410 and 420 of method 400. It should be noted, that as described above, when the UE 110 or the P-CSCF initiates a TCP connection as part of the registration process a timer is set. As described above, this timer, when it times out, causes the P-CSCF to close the TCP connection. However, before the timer times out, the UE 110 may be prevented from opening a new TCP connection. Thus, upon reconnecting to the RAT, the UE 110 may not be able to re-establish a new TCP connection if there is a connectivity issue.

If the UE 110 detects a RAT change in 530, the UE 110 may then determine in 550 whether there is a connectivity issue using the RAT. The UE 110 may be able to determine this based on the feedback received at the TCP layer from the lower layers. That is, the TCP layer may receive feedback from the PHY layer, data link layer, radio link layer (RLC), etc. and based on this feedback may determine whether the connection is working properly. For example, if the lower layers are showing that network traffic is being exchanged, the TCP layer may determine that the connection is working properly. If the connection is working properly, then the UE 110 may communicate using the new RAT in 520 and any issue may be unrelated to the connection with the IMS 150.

However, if there is a connectivity issue, such as the lower layers showing little or no traffic, the TCP layer may indicate that there is a connectivity issue with the IMS 150. As a result of this indication, the UE 110 may reset the timer to a value that is timed out (or treat the timer as timed out), thereby allowing the UE 110 to re-attempt to connect with the P-CSCF and establish a TCP connection. In an alternative embodiment, instead of treating the timer as timed out, the UE 110 may shorten the length of the timer. For example, the TCP layer may receive feedback from the lower layers that indicates there is some traffic, but not enough to indicate that the connection is satisfactory. In this case, the UE 110 may shorten the length of the timer to allow for additional traffic to be exchanged, but not so long that if the connection is unsatisfactory to cause degraded user performance. This would allow the UE 110 to re-attempt to connect with the P-CSCF and establish a TCP connection in a shorter time than waiting for the complete timer duration.

FIG. 6 shows a third exemplary method 600 for switching between RATs according to various embodiments described herein. The method 600 will be described with reference to the network arrangement 100 of FIG. 1. In the example, it may be considered to address the above-described scenario where the UE 110 is switching between the LTE-RAN 122 and the legacy RAN 120. However, it should be understood that the exemplary method may be applied to any switching between different RATs.

In 610, the UE 110 may connect to a RAT and in 620, the UE 110 may communicate via the connected RAT. These actions are the same as described above for 410 and 420 of method 400. In 630, the UE 110 detects a RAT change. In 640, the stack of the UE 110 receives feedback from the lower layers, e.g., the RLC layer, which will indicate whether there is a successful exchange of messages with the IMS 150. It should be noted that this method of using feedback to the higher layers of the stack from the lower layers may be used when TCP is not the transport mechanism of choice, e.g., the TCP layer may not provide sufficient feedback. For example, when the issue being experienced by the UE 110 is a call handling issue as described above, the lower layers may provide feedback to the higher layers that implement the SIP. These SIP layers may then understand if the reason that calls are not connecting or remain connected is the result of a faulty connection with the IMS 150, thereby allowing the UE 110 to take corrective action.

In 650 it is determined whether there is a connectivity issue based on the feedback received. If the connection is working properly, then the UE 110 may communicate using the new RAT in 620. If the connection is not working properly, the UE 110 may take corrective action in 660. For example, the UE 110 may re-initiate the TCP connection with the P-CSCF. Other corrective actions may also be taken.

It should be noted that the exemplary embodiments described with reference to FIGS. 4-6 are described with reference to IMS 150 registration. However, those skilled in the art will understand that the methods may be equally applied to any IMS 150 application, not just registration. That is, whenever there is a question concerning the connectivity with the IMS 150, the methods 400-600 may be used to diagnose and resolve the issues.

Figure 7:
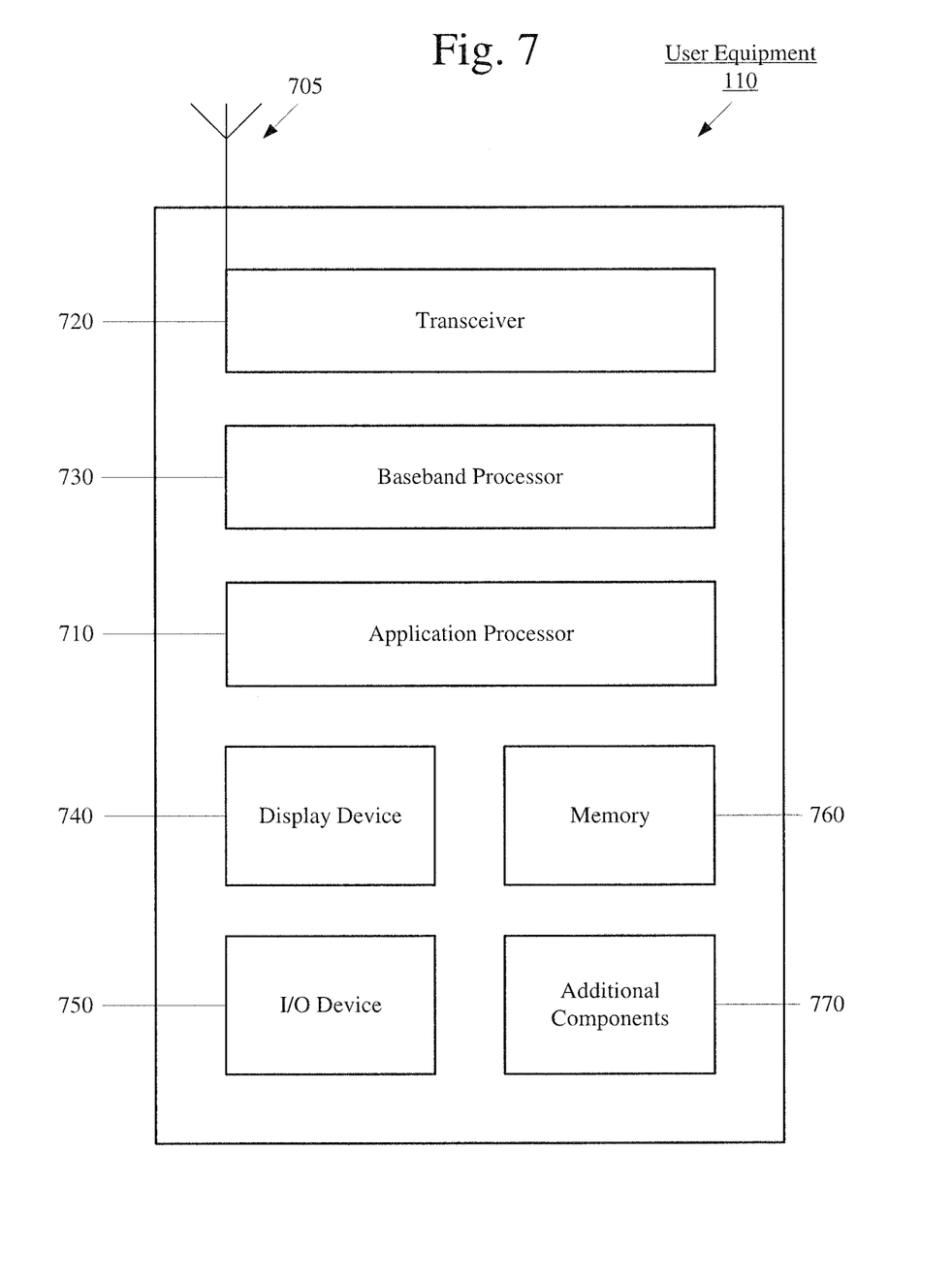
FIG. 7 shows an exemplary UE capable of switching between RATs, according to various embodiments described herein.

FIG. 7 shows an exemplary UE 110 capable of switching between RATS according to various embodiments described herein. As described above, UEs 112 and 114 may have similar components and functionalities. The UE 110 may represent any electronic device that is configured to perform wireless functionalities. For example, the UE 110 may be a portable device such as a phone, a smartphone, a tablet, a phablet, a laptop, a wearable, etc. In another example, the UE 110 may be a stationary device such as a desktop terminal. The UE 110 may be a VoLTE-capable SRLTE device for communicating with a mobile switching center. The UE 110 may include an antenna 705 connected to a transceiver 720, which is connected to a baseband processor 730, which is further connected to an applications processor 710. The UE 110 may further include a display 740, an I/O device 750, and a memory arrangement 760 that are accessible by the baseband processor 730 or the applications processor 710. Those skilled in the art will understand that the UE 110 may also include additional components 770, for example, a Bluetooth/WiFi transceiver, further input devices (e.g., a keypad, a touchscreen, etc.), a battery, etc.

The transceiver 720 and the baseband processor 730 may be used to perform operations such as, but not limited to, scanning the network for specific radio frequency bands, exchanging information with one or more mobile switching centers, etc. It should be noted that the above exemplary embodiments may be performed by the transceiver 720 and the baseband processor 730. However, either of these components may perform the described functionalities without the other component. In addition, other components (e.g., the application processor 710) may also perform some or all of the functionalities described herein. The application processor 710, the transceiver 720 and the baseband processor 730 may be, for example, general purpose processors, an application specific integrated circuit (ASIC), another type of integrated circuit and these processors may execute software programs or firmware.

The exemplary apparatuses, systems and methods described above may be implemented in any number of scenarios to improve the overall operations of the UEs when transitioning between RATS. For example, when describing each of the above exemplary methods, exemplary implementation scenarios were described. The exemplary methods while being applicable to these implementation scenarios are also applicable to other implementation or operating scenarios. The exemplary scenarios were only described to provide context for the exemplary methods.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
at a user equipment ("UE") connected to a first network:
receiving a page from the first network indicating an incoming voice call;
determining whether the voice call was successfully connected;
when it is determined the voice call was not successfully connected, incrementing a value of a counter;
determining whether the value of the counter satisfies a threshold, wherein the threshold is dynamically set based on a comparison of a first measured property and a second measured property; and
when the value satisfies the threshold, switching from the first network to a second network.

2. The method of claim 1, wherein the first network is a Long Term Evolution (LTE) network and the incoming voice call is a Voice over LTE (VoLTE) call and the second network is a network that handles voice calls using a circuit switched network.

3. The method of claim 2, wherein the second network is one of a Global System for Mobile (GSM) network, a Universal Mobile Telecommunications System (UMTS) network, a Code Division Multiple Access (CDMA) network or a CDMA 2000 1× network.

4. The method of claim 1, further comprising:
when it is determined the voice call was not successfully connected and the value of the counter does not satisfy the threshold, performing one of:
re-attempting to respond to the page of the first network to connect the voice call; or
waiting to receive a second page for the voice call from the first network.

5. The method of claim 1, wherein the value of the counter that satisfies the threshold is based on measured properties of a reference signal received by UE.

6. The method of claim 5, wherein the measured properties of the reference signal include one of a Received Signal Strength Indicator ("RSSI"), a Reference Signal Received Power ("RSRP"), or a Reference Signal Received Quality ("RSRQ").

7. The method of claim 1, further comprising:
when the voice call is successfully connected, resetting the value of the counter to an original value.

8. The method of claim 1, wherein the first measured property and the second measured property correspond to at least one of a received signal strength indicator ("RSSI"), a reference signal received power ("RSRQ"), or a reference signal received quality ("RSRQ").

9. A method, comprising:
at a user equipment ("UE") connected to a first network:
originating a voice call to a further UE via the first network; determining whether the voice call was successfully connected; when it is determined the voice call was not successfully connected due to an unavailable socket connection, opening a socket connection with the first network;
and attempting to re-originate the voice call to the further UE via the first network;
when it is determined the voice call was not successfully connected, starting a timer; determining whether the timer has expired; and when the timer has not expired, continuing to attempt to re-originate the voice call via the first network;
when the timer expires and the voice call is not successfully connected, switching from the first network to a second network.

10. The method of claim 9, wherein the first network is a Long Term Evolution (LTE) network and the voice call is a Voice over LTE (VoLTE) call.

11. The method of claim 9, wherein the socket connection is a TCP connection with a Proxy-Call Session Control Function (P-CSCF) of an IP Multimedia Subsystem (IMS).

12. A method, comprising:
at a user equipment ("UE"):
determining whether the UE has switched a connection from a first network to a second network; and
when it is determined that the UE has switched the connection to the second network
resetting a registration timer of the UE, wherein;
the registration timer is based on a connection with the IMS of the second network;
when the registration timer expires, the UE reinitiates a TCP connection with the Proxy-Call Session Control Function (P-CSCF) of a IP Multimedia Subsystem (IMS) of the second network; and
the resetting of the registration timer causes the registration timer to at least one of expire or have a shorter duration than an original duration.

13. The method of claim 12, wherein the UE had a previous connection to the second network before connecting to the first network.

14. The method of claim 12, wherein, prior to the resetting of the registration timer, the method further comprises:
determining an amount of traffic between a lower layer of a network stack of the UE and the IMS.

15. The method of claim 12, further comprising:
sending feedback from a lower layer of a network stack of the UE to a higher layer of the network stack of the UE, wherein the feedback is based on a connection with the IMS of the second network; and
based on the feedback from the lower layer of the network stack, re-initiating a TCP connection with the P-CSCF of the IMS of the second network.

16. The method of claim 12, wherein the second network is a Long Term Evolution (LTE) network.

* * * * *

UNITED STATES PATENT AND TRADEMARK OFFICE
CERTIFICATE OF CORRECTION

PATENT NO. : 10,064,112 B2
APPLICATION NO. : 14/727550
DATED : August 28, 2018
INVENTOR(S) : Deivasigamani et al.

Page 1 of 1

It is certified that error appears in the above-identified patent and that said Letters Patent is hereby corrected as shown below:

On the Title Page

Item (72), inventors' names:
"Guarav Nukala" should read "Gaurav Nukala"
"Srinivasan Vasudeven" should read "Srinivasan Vasudevan"

Signed and Sealed this
Eighteenth Day of June, 2019

Andrei Iancu
*Director of the United States Patent and Trademark Office*